US011580053B2

United States Patent
Maung et al.

(10) Patent No.: US 11,580,053 B2
(45) Date of Patent: *Feb. 14, 2023

(54) SERIAL BUS SIGNAL CONDITIONER FOR DETECTING INITIATION OF OR RETURN TO HIGH-SPEED SIGNALING

(71) Applicant: TEXAS INSTRUMENTS INCORPORATED, Dallas, TX (US)

(72) Inventors: Win Naing Maung, Plano, TX (US); Suzanne Mary Vining, Plano, TX (US); Yonghui Tang, Plano, TX (US); Douglas Edward Wente, Murphy, TX (US); Huanzhang Huang, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/347,920

(22) Filed: Jun. 15, 2021

(65) Prior Publication Data

US 2021/0311903 A1    Oct. 7, 2021

Related U.S. Application Data

(63) Continuation of application No. 16/751,411, filed on Jan. 24, 2020, now Pat. No. 11,068,435.

(60) Provisional application No. 62/797,391, filed on Jan. 28, 2019.

(51) Int. Cl.
G06F 13/42    (2006.01)

(52) U.S. Cl.
CPC .. *G06F 13/4295* (2013.01); *G06F 2213/0042* (2013.01)

(58) Field of Classification Search
CPC .. G06F 13/4295; G06F 13/4004; G06F 13/38; G06F 13/36; G06F 13/4068; G06F 13/4072; G06F 2213/0042
See application file for complete search history.

(56) References Cited

U.S. PATENT DOCUMENTS

| 8,185,682 | B2 | 5/2012 | Bandholz et al. |
| 9,710,411 | B2 | 7/2017 | Maung et al. |
| 11,068,435 | B2* | 7/2021 | Maung ................ G06F 13/4295 |
| 2008/0287771 | A1 | 11/2008 | Anderson |
| 2014/0003306 | A1 | 1/2014 | Chen et al. |
| 2015/0227489 | A1 | 8/2015 | Chen et al. |
| 2016/0357699 | A1 | 12/2016 | Shamarao et al. |
| 2017/0199829 | A1 | 7/2017 | Boyer et al. |
| 2018/0173666 | A1 | 6/2018 | Srivastava |

(Continued)

*Primary Examiner* — Raymond N Phan
(74) *Attorney, Agent, or Firm* — John R. Pessetto; Frank D. Cimino

(57) ABSTRACT

A serial bus signal conditioner circuit includes receiver circuitry, a mode identification circuit, and an edge-rate booster circuit. The receiver circuitry is configured to receive signals transmitted on a serial bus. The mode identification circuit is coupled to the receiver circuitry, and is configured to identify initiation of or return to high-speed signaling on the serial bus based on sequences of the signals transmitted on the serial bus. The edge-rate booster circuit is coupled to the mode identification circuit, and is configured to identify edges of a differential signal transmitted on the serial bus, and to supply a differential current to the serial bus based on identification of an edge of the differential signal.

10 Claims, 6 Drawing Sheets

(56) References Cited

U.S. PATENT DOCUMENTS

2018/0335830 A1 11/2018 Srivastava
2018/0373670 A1 12/2018 Low et al.
2019/0073329 A1 3/2019 Tao et al.

* cited by examiner

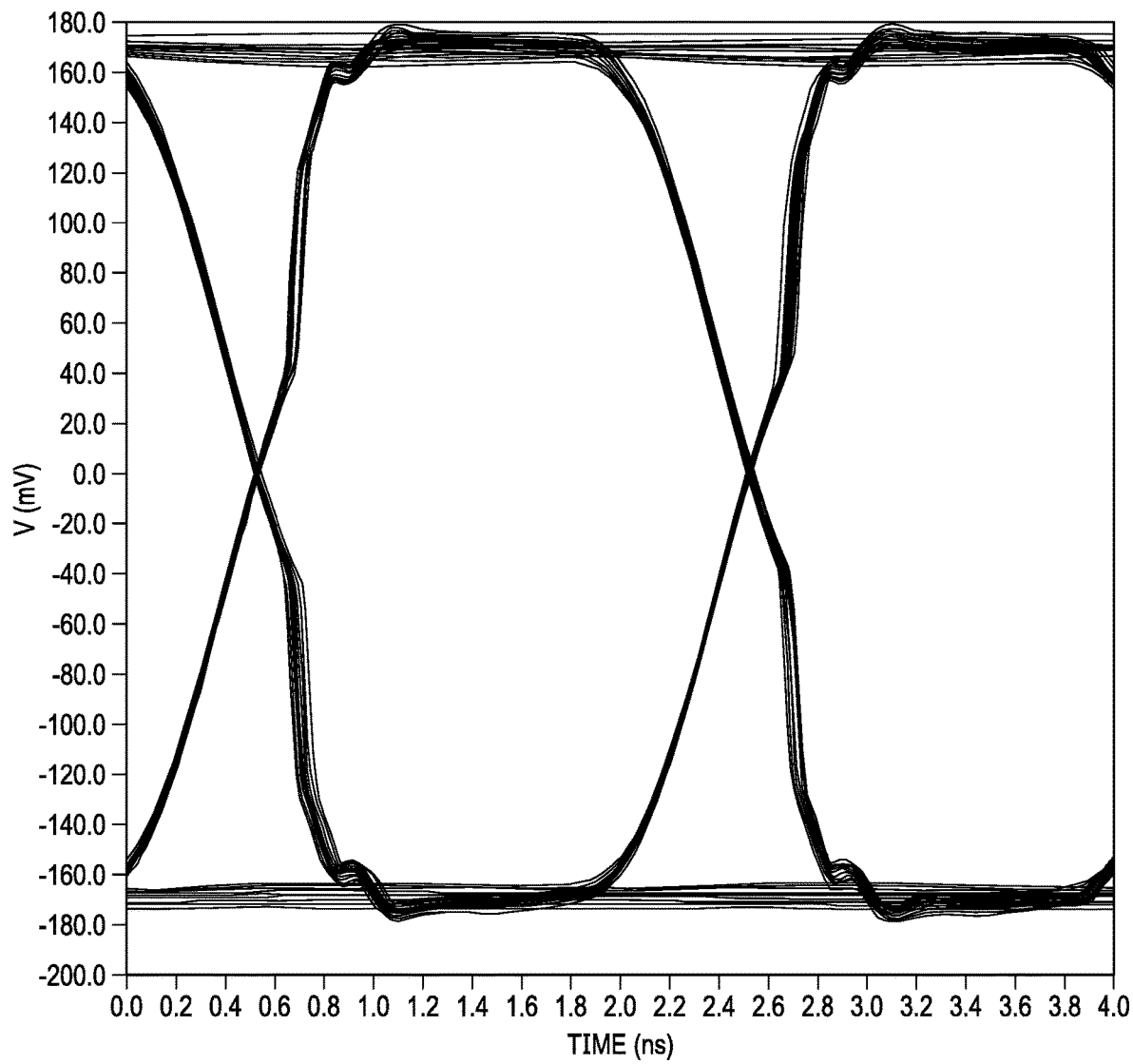

SERIAL BUS SIGNAL CONDITIONER FOR DETECTING INITIATION OF OR RETURN TO HIGH-SPEED SIGNALING

CROSS-REFERENCE TO RELATED APPLICATIONS

This continuation application claims priority to U.S. patent application Ser. No. 16/751,411, filed Jan. 24, 2020, which claims priority to and the benefit of U.S. Provisional Patent Application No. 62/797,391, filed Jan. 28, 2019, both of which are incorporated herein by reference in their entirety.

BACKGROUND

Serial buses, such as the Universal Serial Bus (USB), are widely used to connect systems of devices. The expansion of USB has resulted in a wide variety of USB devices with varying communication and power requirements. Embedded USB enables communication and reduces power consumed by communication between components mounted on a circuit board or assembly. Embedded USB allows for communication between devices at reduced voltages that support continued reduction of device feature size.

SUMMARY

A serial bus signal conditioner circuit that improves the edge rate of high-speed signaling via the embedded universal serial bus (eUSB2) is disclosed herein. In one example, a serial bus signal conditioner circuit includes receiver circuitry, a mode identification circuit, and an edge-rate booster circuit. The receiver circuitry is configured to receive signals transmitted on a serial bus. The mode identification circuit is coupled to the receiver circuitry, and is configured to identify initiation of or return to high-speed signaling on the serial bus based on sequences of the signals transmitted on the serial bus. The edge-rate booster circuit is coupled to the mode identification circuit, and is configured to identify edges of a differential signal transmitted on the serial bus, and to supply a differential current to the serial bus based on identification of an edge of the differential signal.

In another example, a system includes a first eUSB2 device, a second eUSB2 device, and a serial bus signal conditioner circuit. The first eUSB2 device is coupled to the second eUSB2 device by a serial bus. The serial bus signal conditioner circuit is coupled to the serial bus, and includes receiver circuitry, a mode identification circuit, and an edge-rate booster circuit. The receiver circuitry is configured to receive signals transmitted on the serial bus. The mode identification circuit is coupled to the receiver circuitry, and is configured to identify initiation of or return to high-speed signaling on the serial bus based on sequences of the signals transmitted on the serial bus. The edge-rate booster circuit is coupled to the mode identification circuit, and is configured to identify edges of a differential signal transmitted on the serial bus, and to supply a differential current to the serial bus based on identification of an edge of the differential signal.

In a further example, a method includes receiving, by a serial bus signal conditioner circuit, signals transferred from a first device to a second device via a serial bus. Initiation of or return to high-speed signaling on the serial bus is identified, by a mode identification circuit of the serial bus signal conditioner circuit, based on sequences of the signals transmitted on the serial bus. An edge-rate booster circuit of the serial bus signal conditioner circuit is enabled responsive to identification of the initiation of or return to high-speed signaling on the serial bus. Edges of a differential signal transmitted on the serial bus are detected by the edge-rate booster circuit. A differential current is provided to the serial bus by the edge-rate booster circuit based on a detected edge of the differential signal.

BRIEF DESCRIPTION OF THE DRAWINGS

For a detailed description of various examples, reference will now be made to the accompanying drawings in which:

FIGS. 8A and 8B show example signals to which conditioning has been applied in accordance with the present disclosure.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Implementations of the embedded universal serial bus (eUSB2) are used to provide communication between devices mounted on a circuit board. The eUSB2 specification recommends that conductors between connected devices be limited to no more than 10 inches in length. However, use of longer conductors can be beneficial in some applications where larger board sizes or flex cable connections are needed. Some systems include a repeater to extend the distance between eUSB2 devices. Repeaters add jitter and skew, may truncate start of packet bits, and may add dribble bits at the end of a packet.

The serial bus signal conditioning circuit disclosed herein does not repeat data and is therefore not subject to the various shortcomings of repeaters. The serial bus signal conditioning circuit detects the initiation of or return to high-speed signaling and injects differential current onto the serial bus in response to the rising and falling edges of differential signals detected on the serial bus. The injected current improves the rise and fall times of the signals traveling in either direction over the serial bus to allow for an increase in the transmission distance of the signals.

Figure 1:
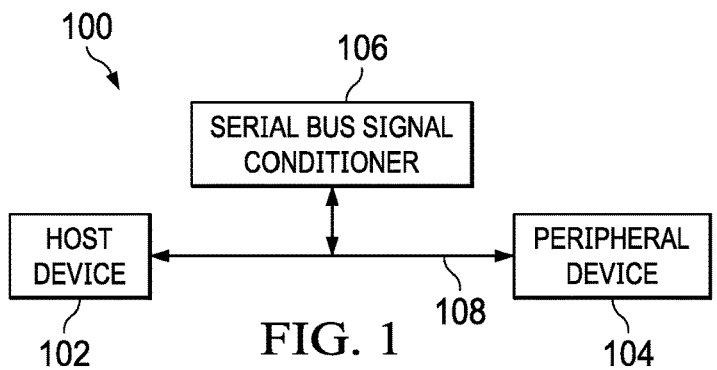
FIG. 1 shows a block diagram for an example serial bus system that includes a serial bus signal conditioner circuit in accordance with the present disclosure.

FIG. 1 shows a block diagram for an example serial bus system 100 in accordance with the present disclosure. The serial bus system 100 includes a device 102, a device 104, and a serial bus signal conditioner circuit 106. The device 102 and the device 104 are coupled to and communicate via the serial bus 108. The serial bus signal conditioner circuit 106 is also coupled to the serial bus 108. The device 102 and the device 104 are eUSB2 compliant devices in some implementations of the serial bus system 100, and are configured to communicate in native mode according to the eUSB2 specification.

Implementations of the device 102 and the device 104 support multiple communication modes. For example, the device 102 and the device 104 support a low-speed mode providing communication at about 1.5 megabits per second (Mb/s), a full-speed mode providing communication at about 12 Mb/s, and a high-speed mode providing communication at about 480 Mb/s. The serial bus signal conditioner circuit 106 monitors communication between the device 102 and device 104 by receiving the signals transmitted via the serial bus 108. When the serial bus signal conditioner circuit 106 identifies an exchange between the device 102 and the device 104 indicating the initiation of or return to high-speed signaling (i.e., commencement of high-speed mode communication) via the serial bus 108, the serial bus signal conditioner circuit 106 enables signal conditioning to improve the transition times of differential signals transmitted via the serial bus 108 in high-speed mode. The serial bus signal conditioner circuit 106 conditions the signals on the serial bus 108 during high-speed signaling by detecting the edges of the differential signals on the serial bus 108 and injecting differential current onto the serial bus 108 to increase the rate of edge transition. By decreasing the transition time of the edges on the serial bus 108, the serial bus signal conditioner circuit 106 improves the eye pattern of the signals on the serial bus 108 and allows the length of the serial bus 108 to be increased.

Figure 2:
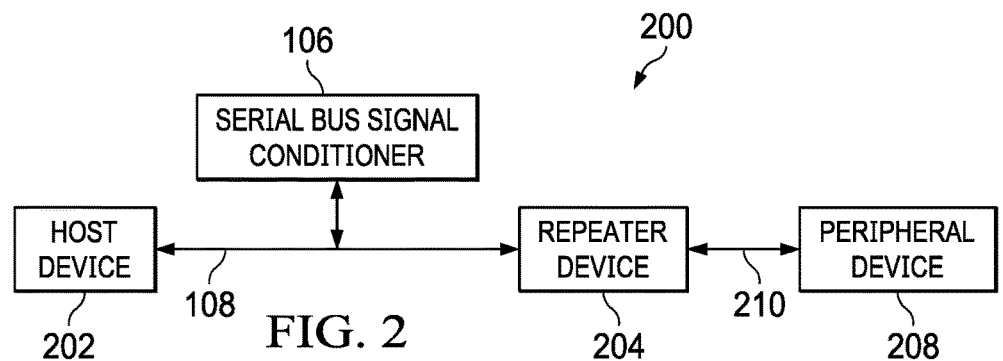
FIG. 2 shows a block diagram for another example serial bus system that includes a serial bus signal conditioner circuit in accordance with the present disclosure.

FIG. 2 shows a block diagram for another example serial bus system 200 in accordance with the present disclosure. The serial bus system 200 includes the serial bus signal conditioner circuit 106, a device 202, and a device 204 coupled to the serial bus 108. The device 204 is an implementation of the device 104, that operates a repeater device (the device 104 may be a non-repeater device). The device 204 communicates with the device 202 via the serial bus 108, and passes communication received from the device 202 to a device 208. The device 208 is incompatible with protocols applied on the serial bus 108, and the device 204 repeats communication received via the serial bus 108 using protocols suitable for communication with the device 208. For example, voltages applied on the serial bus 210 connecting the device 204 and the device 208 are different than the voltages applied on the serial bus 108 in some implementations of the serial bus system 200.

The serial bus signal conditioner circuit 106 monitors communication between the device 202 and device 204 by receiving the signals transmitted via the serial bus 108. When the serial bus signal conditioner circuit 106 identifies an exchange between the device 202 and the device 204 indicating the initiation of or return to high-speed signaling (i.e., commencement of high-speed mode communication) via the serial bus 108, the serial bus signal conditioner circuit 106 enables signal conditioning to improve the transition times of differential signals transmitted via the serial bus 108 in high-speed mode. The exchange provided between the device 202 and the device 204 is different from the exchange provided between the device 102 and the device 104 in some implementations. The serial bus signal conditioner circuit 106 conditions the signals on the serial bus 108 during high-speed signaling by detecting the edges of the differential signals on the serial bus 108 and injecting differential current onto the serial bus 108 to increase the rate of edge transition. By decreasing the transition time of the edges on the serial bus 108, the serial bus signal conditioner circuit 106 improves the eye pattern of the signals on the serial bus 108 and allows the length of the serial bus 108 to be increased.

Figure 3:
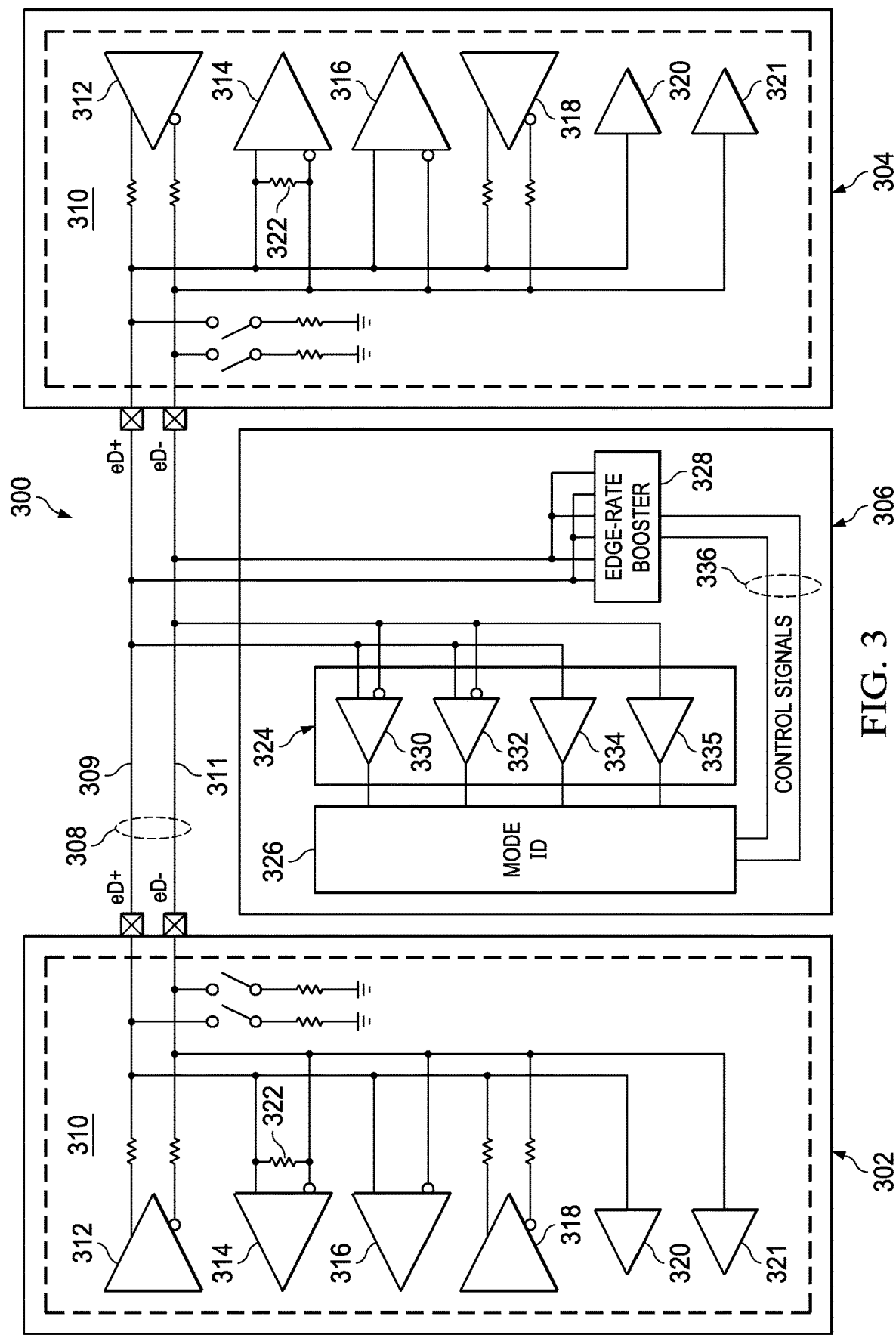
FIG. 3 shows a block diagram for an example serial bus system with additional details of the devices and serial bus conditioner circuit.

FIG. 3 shows an example serial bus system 300. The serial bus system 300 is an implementation of the serial bus system 100. The serial bus system 300 includes a device 302, a device 304, and a serial bus signal conditioner circuit 306 each of which is coupled to a serial bus 308. The device 302, device 304, serial bus signal conditioner circuit 306, and serial bus 308 are implementations of the device 102, the device 104, the serial bus signal conditioner circuit 106, and the serial bus 108 respectively. The device 302 and the device 304 are eUSB2 devices in some implementations of the serial bus system 300. The serial bus 308 includes a conductor 309 and a conductor 311 for transfer of differential signals between the device 302 and the device 304. The device 302 includes transceiver circuitry 310 for transmitting and receiving signals via the serial bus 308. The transceiver circuitry 310 includes a high-speed transmitter circuit 312, a high-speed receiver circuit 314, a high-speed squelch circuit 316, a low/full-speed transmitter circuit 318, a low/full-speed receiver circuit 320, and a low/full-speed receiver circuit 321. The low/full-speed transmitter circuit 318, the low/full-speed receiver circuit 320, and the low/full-speed receiver circuit 321 are used to transmit and receive when the device 302 and the device 304 are communicating in low-speed mode or full-speed mode. The high-speed transmitter circuit 312, the high-speed receiver circuit 314, and the high-speed squelch circuit 316 are used to transmit and receive when the device 302 and the device 304 are communicating in high-speed mode.

A termination resistor 322 is coupled to the inputs of the high-speed receiver circuit 314 (e.g., each terminal of the termination resistor is coupled to an end of the conductor 309 or the conductor 311). In an implementation of the serial bus system 300 corresponding to the serial bus system 100 (e.g., native mode eUSB2), the termination resistor 322 is disconnected from at least one of the inputs of the high-speed receiver circuit 314. For example, a switch that couples an input terminal of the high-speed receiver circuit 314 to a terminal of the termination resistor 322 is open. In an implementation of the serial bus system 300 corresponding to the serial bus system 200 (e.g., repeater mode eUSB2), the termination resistor 322 is connected to the inputs of the high-speed receiver circuit 314 as shown in FIG. 3. As a result of the difference in termination applied in the two operation modes, the voltages on the serial bus 308 differ. For example, the voltages on the serial bus 308 in an implementation of the serial bus system 300 corresponding to the serial bus system 100 (native mode eUSB2) are about twice the voltages on the serial bus 308 in an implementation of the serial bus system 300 corresponding to the serial bus system 200 (repeater mode eUSB2).

The device 304 is coupled to the device 302 via the serial bus 308. The device 304 includes an instance of the transceiver circuitry 310 for transmitting and receiving in low, full, and high-speed modes.

The serial bus signal conditioner circuit 306 is coupled to the serial bus 308 at any selected point along the length of the serial bus 308. For example, in various implementations, the serial bus signal conditioner circuit 306 is coupled to the serial bus 308 at a mid-point, an end point, or any other selected location along the length of the serial bus 308. The serial bus signal conditioner circuit 306 includes receiver circuitry 324, a mode identification circuit 326, and an edge-rate booster circuit 328. The receiver circuitry 324 is coupled to the serial bus 308 for reception of signals on the serial bus 308. The receiver circuitry 324 includes a high-speed receiver circuit 330, a high-speed squelch circuit 332, a low/full-speed receiver circuit 334, and a low/full-speed receiver circuit 335. The high-speed receiver circuit 330 and the high-speed squelch circuit 332 are differential input receivers for receiving the differential signals transmitted in high-speed mode. The low/full-speed receiver circuit 334 and the low/full-speed receiver circuit 335 are single-ended receivers for receiving the single-ended signals transmitted in low/full speed modes.

Figure 4:
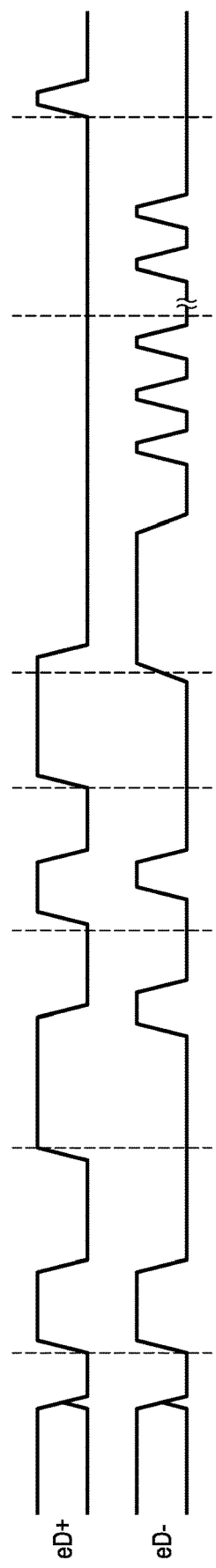
FIG. 4 shows an example of serial bus signals exchanged in the system of FIG. 1 to initiate high-speed signaling.
Figure 5:
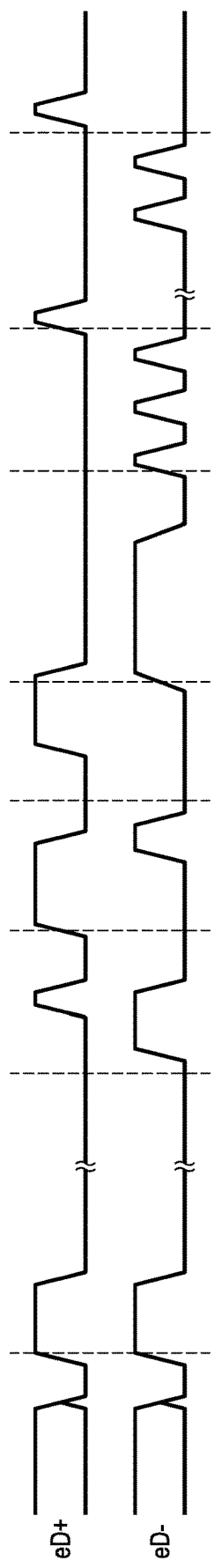
FIG. 5 shows an example of serial bus signals exchanged in the system of FIG. 2 to initiate high-speed signaling.

Outputs of the receiver circuitry 324 are coupled to the mode identification circuit 326 for providing signals received from the serial bus 308 to the mode identification circuit 326. The mode identification circuit 326 monitors the signals received from the receiver circuitry 324 to identify sequences of signals that indicate initiation of or return to high-speed signaling on the serial bus 308 (i.e. transition to high-speed mode). FIG. 4 shows an example of a sequence of signals on the serial bus 308 for initiating high-speed signaling in an implementation of the serial bus system 300 corresponding to the serial bus system 100 (e.g., eUSB2 native mode). FIG. 5 shows an example of a sequence of signals on the serial bus 308 for initiating high-speed signaling in an implementation of the serial bus system 300 corresponding to the serial bus system 200 (e.g., eUSB2 repeater mode). The mode identification circuit 326 includes circuitry, such as a finite state machine, that monitors and identifies signal sequences, such as the signal sequences of FIGS. 4 and 5, that indicate initiation of high-speed signaling on the serial bus 308.

The mode identification circuit 326 generates control signals 336 that activate the edge-rate booster circuit 328 to condition the signals on the serial bus 308. When the mode identification circuit 326 identifies initiation of or return to the high-speed signaling on the serial bus 308, the mode identification circuit 326 activates the control signals 336 to enable the edge-rate booster circuit 328 to condition the signals on the serial bus 308. For example, an implementation of the mode identification circuit 326 activates the control signals 336 on identification of the signal sequence of FIG. 4 or identification of the signal sequence of FIG. 5.

The edge-rate booster circuit 328, when enabled, receives the differential signals provided on the serial bus 308 in high-speed mode, detects the edges of the signals, and provides a differential current to the serial bus 308 at a detected edge to increase the transition rate of the edge.

Figure 6:
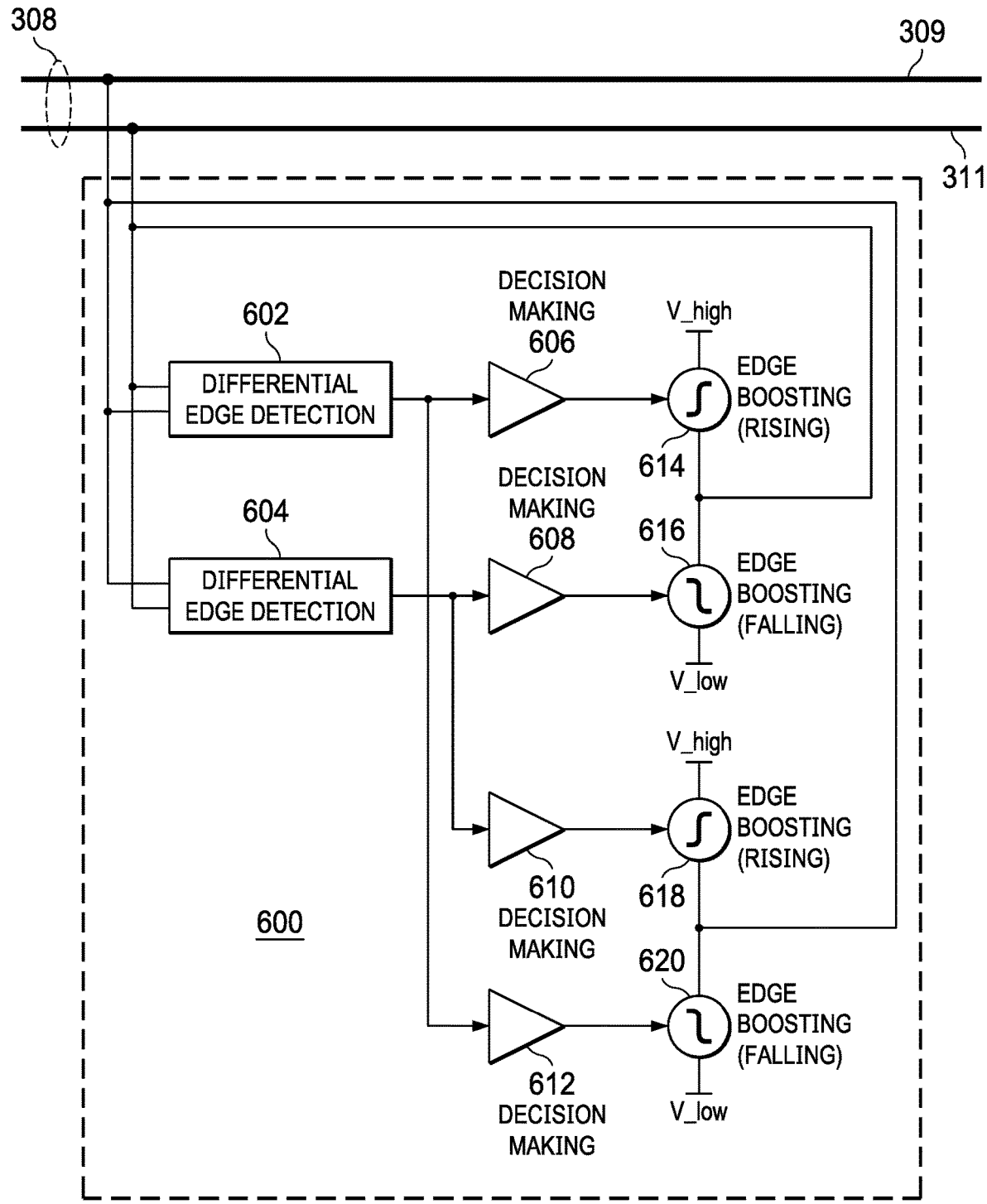
FIG. 6 shows a block diagram for an example edge rate booster circuit in accordance with the present disclosure.

FIG. 6 shows a block diagram for an example edge rate booster circuit 600 in accordance with the present disclosure. The edge rate booster circuit 600 is an implementation of the serial bus signal conditioner circuit 106 or the serial bus signal conditioner circuit 306. The edge rate booster circuit 600 includes differential edge detection circuit 602, differential edge detection circuit 604, decision circuit 606, decision circuit 608, decision circuit 610, decision circuit 612, current source 614, current source 616, current source 618, and current source 620. The differential edge detection circuit 602 and the differential edge detection circuit 604 are coupled to the serial bus 308, and detect rising and falling edges of differential signal on the serial bus 308. For example, the differential edge detection circuit 602 detects falling edges of differential signals on the serial bus 308, and the differential edge detection circuit 604 detects rising edges of differential signals on the serial bus 308.

An output of the differential edge detection circuit 602 is coupled to the decision circuit 606 and the decision circuit 612. On detection of a falling edge of the differential signal on the serial bus 308 by the differential edge detection circuit 602, the decision circuit 606 and the decision circuit 612 determine whether to activate the current source 614 and the current source 620 to provide current to the conductor 311 and the conductor 309 respectively. For example, if the slew rate of the detected edge of the differential signal is within a predefined range, then the decision circuit 606 and the decision circuit 612 activate the current source 614 and the current source 620 to provide current to the conductor 311 and the conductor 309. The current source 614 sources current to the conductor 311 to boost a rising edge on the conductor 311. The current source 620 sinks current from the conductor 309 to boost a falling edge on the conductor 309. The current source 614 and the current source 620 include switches to connect/disconnect the current sources from the conductor 311 and the conductor 309 responsive to a signal received from the decision circuit 606 or the decision circuit 612.

An output of the differential edge detection circuit 604 is coupled to the decision circuit 608 and the decision circuit 610. On detection of a rising edge of the differential signal on the serial bus 308 by the differential edge detection circuit 604, the decision circuit 608 and the decision circuit 610 determine whether to activate the current source 616 and the current source 618 to provide current to the conductor 311 and the conductor 309 respectively. For example, if the slew rate of the detected edge of the differential signal is within a predefined range, then the decision circuit 608 and the decision circuit 610 activate the current source 616 and the current source 618 to provide current to the conductor 311 and the conductor 309. The current source 616 sinks current from the conductor 311 to boost a falling edge on the conductor 311. The current source 618 sources current to the conductor 309 to boost a rising edge on the conductor 309. The current source 616 and the current source 618 include switches to connect/disconnect the current sources from the conductor 311 and conductor 309 responsive to a signal received from the decision circuit 608 or the decision circuit 610.

Because the voltage of the differential signals on the serial bus 308 varies with the operation mode of the serial bus system 300 (e.g., vary with connection of the termination resistor 322 in the device 302 and the device 304), the edge rate booster circuit 600 controls the currents provided to the serial bus 308 to ensure that the maximum signal voltages on the serial bus 308 are not exceeded. In some implementations, the control signals 336 select an appropriate voltage based on the operational mode of the serial bus system 300, such that in a first operational mode the differential currents provided by the edge rate booster circuit 600 maintain the voltage on the serial bus 308 within a first range, and in a second operational mode the differential currents provided by the edge rate booster circuit 600 maintain the voltage on the serial bus 308 within a second range. For example, in the first operational mode (e.g., eUSB2 native mode using a non-repeater device), a maximum voltage provided on the serial bus 308 is greater than (e.g., about twice) the voltage provided in the second operational mode (e.g., eUSB2 repeater mode using a repeater device).

Figure 7:
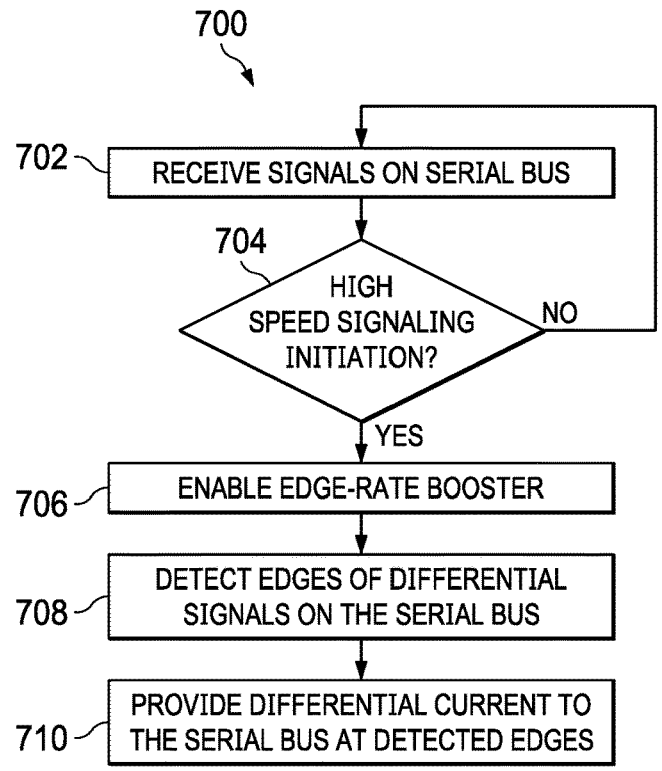
FIG. 7 shows a flow diagram for an example method for conditioning serial bus signals in accordance with the present disclosure.

FIG. 7 shows a flow diagram for an example method 700 for conditioning serial bus signals in accordance with the present disclosure. Though depicted sequentially as a matter of convenience, at least some of the actions shown can be performed in a different order and/or performed in parallel. Additionally, some implementations may perform only some of the actions shown. Operations of the method 700 are performed by an implementation of the serial bus system 100, the serial bus system 200, or the serial bus system 300.

In block 702, the receiver circuitry 324 of the serial bus signal conditioner circuit 306 receives signals provided on the serial bus 308. For example, the receiver circuitry 324 receives signals transferred from the device 302 to the device 304 via the serial bus 308.

In block 704, the mode identification circuit 326 determines whether a sequence of the received signals indicates initiation of or return to high-speed signaling on the serial bus 308. For example, a finite state machine of the mode identification circuit 326 determines whether the sequence of the received signals matches the sequence of signals shown in FIG. 4 or FIG. 5.

If the mode identification circuit 326 determines that the sequence of received signals indicates initiation of or return to high-speed signaling on the serial bus 308, then the mode identification circuit 326 activates the control signals 336 to enable the edge-rate booster circuit 328 in block 706.

In block 708, the edge-rate booster circuit 328 detects edges of the differential signals provided on the serial bus 308 for high-speed signaling.

In block 710, for a detected edge of the differential signal on the serial bus 308, the edge-rate booster circuit 328 provides a differential current to the serial bus 308 to reduce the transition time of the edge.

Figure 8A:
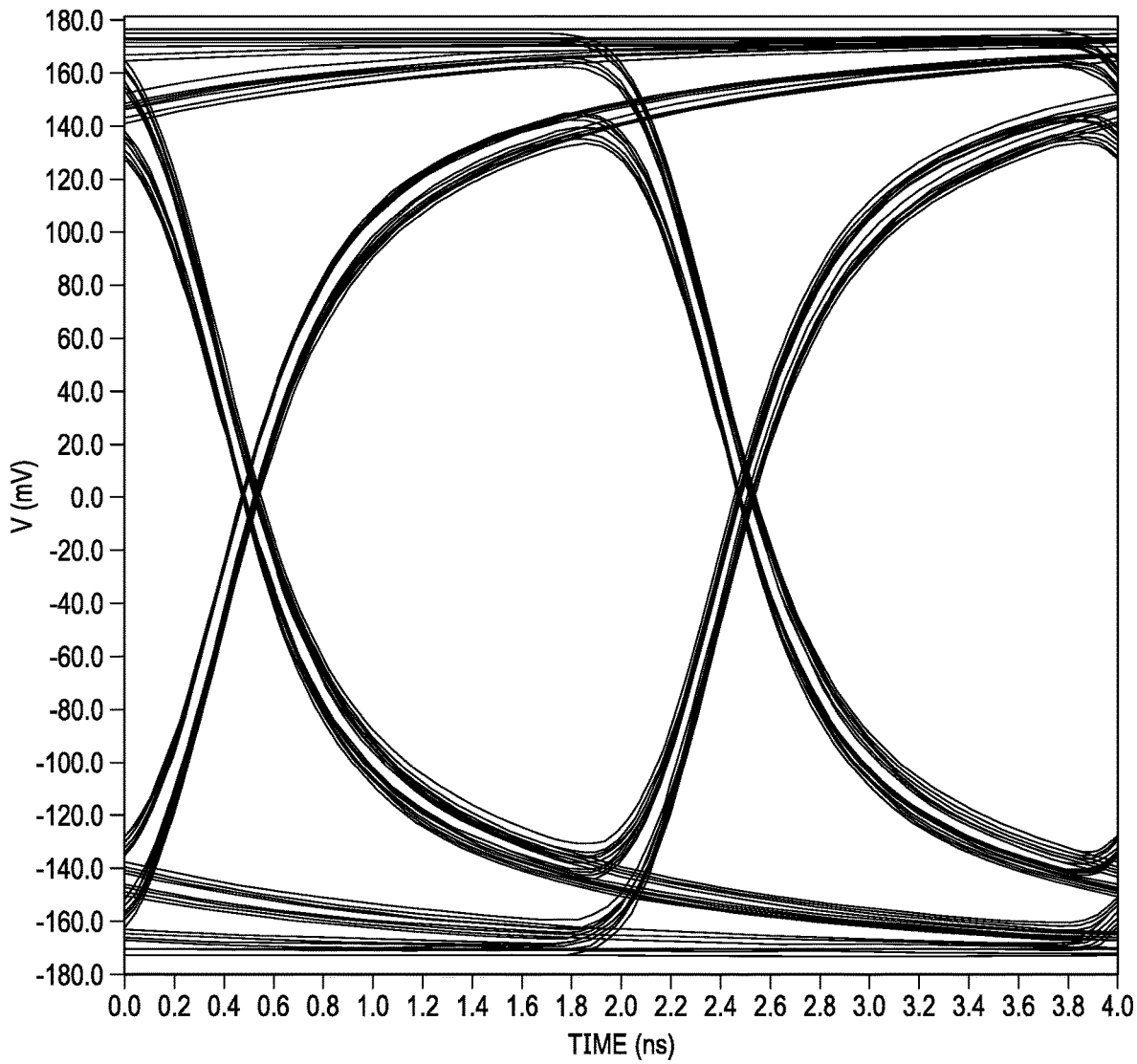

FIGS. 8A and 8B shows example signals to which conditioning has been applied in accordance with the present disclosure. Signals 802 (shown in FIG. 8A) are differential signals on the serial bus 308 unconditioned by the serial bus signal conditioner circuit 306. Signals 804 (shown in FIG. 8B) show the signals 802 after conditioning by the serial bus signal conditioner circuit 306 is applied. The signal conditioning provided by the serial bus signal conditioner circuit 306 improved the edge rates of the signals 804 relative to the edge rates of the signals 802.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A serial bus signal conditioner circuit, comprising:
   receiver circuitry configured to receive signals transmitted on a serial bus;
   a mode identification circuit coupled to the receiver circuitry, and configured to identify initiation of or return to high-speed signaling on the serial bus based on sequences of the signals transmitted on the serial bus;
   an edge-rate booster circuit coupled to the mode identification circuit, and configured to:
   identify edges of a differential signal transmitted on the serial bus; and
   supply a differential current to the serial bus based on identification of an edge of the differential signal.

2. The serial bus signal conditioner circuit of claim 1, wherein the mode identification circuit is configured to identify a first sequence of the signals transmitted on a serial bus indicating initiation of or return to high-speed signaling with a repeater device.

3. The serial bus signal conditioner circuit of claim 1, wherein the mode identification circuit is configured to enable the edge-rate booster circuit based on identification of initiation of or return to high-speed signaling on the serial bus.

4. The serial bus signal conditioner circuit of claim 2, wherein the mode identification circuit is configured to identify a second sequence of the signals transmitted on a serial bus indicating initiation of or return to high-speed signaling with a non-repeater device.

5. A system, comprising:
   a first embedded universal serial bus (eUSB2) device;
   a second eUSB2 device coupled to the first eUSB2 device by a serial bus;
   a serial bus signal conditioner circuit coupled to the serial bus, and comprising:
   receiver circuitry configured to receive signals transmitted on the serial bus;
   a mode identification circuit coupled to the receiver circuitry, and configured to identify initiation of or return to high-speed signaling on the serial bus based on sequences of the signals transmitted on the serial bus;
   an edge-rate booster circuit coupled to the mode identification circuit, and configured to:
   identify edges of a differential signal transmitted on the serial bus; and
   supply a differential current to the serial bus based on identification of an edge of the differential signal.

6. The system of claim 5, wherein, based on the second eUSB2 device being a repeater device, the mode identification circuit is configured to identify a first sequence of the signals transmitted on a serial bus indicating initiation of or return to high-speed signaling between the first eUSB2 device and the repeater device.

7. The system of claim 6, wherein, based on the second eUSB2 device being a non-repeater device, the mode identification circuit is configured to identify a second sequence of the signals transmitted on a serial bus indicating initiation of or return to high-speed signaling between the first eUSB2 device and the non-repeater device, wherein the second sequence is different from the first sequence.

8. The system of claim 5, wherein the mode identification circuit is configured to enable the edge-rate booster circuit based on identification of initiation of or return to high-speed signaling on the serial bus.

9. A method, comprising:
   receiving, by a serial bus signal conditioner circuit, signals transferred from a first device to a second device via a serial bus;
   identifying, by a mode identification circuit of the serial bus signal conditioner circuit, initiation of or return to high-speed signaling on the serial bus based on sequences of the signals transmitted on the serial bus;
   enabling an edge-rate booster circuit of the serial bus signal conditioner circuit responsive to identification of the initiation of or return to high-speed signaling on the serial bus;

detecting, by the edge-rate booster circuit, edges of a differential signal transmitted on the serial bus; and providing, by the edge-rate booster circuit, a differential current to the serial bus based on a detected edge of the differential signal.

10. The method of claim 9, further comprising:

identifying, by the mode identification circuit, a first set of sequences of the signals transmitted on the serial bus indicating initiation of or return to high-speed signaling based on the second device being a repeater device; and identifying, by the mode identification circuit, a second set of sequences of the signals transmitted on the serial bus indicating initiation of or return to high-speed signaling based on the second device being a non-repeater device;

wherein the first sequence is different from the second sequence.

* * * * *